Dec. 31, 1957    V. HAENSEL    2,818,323
PURIFICATION OF GASES WITH AN AMINE
IMPREGNATED SOLID ABSORBENT
Filed Oct. 7, 1953
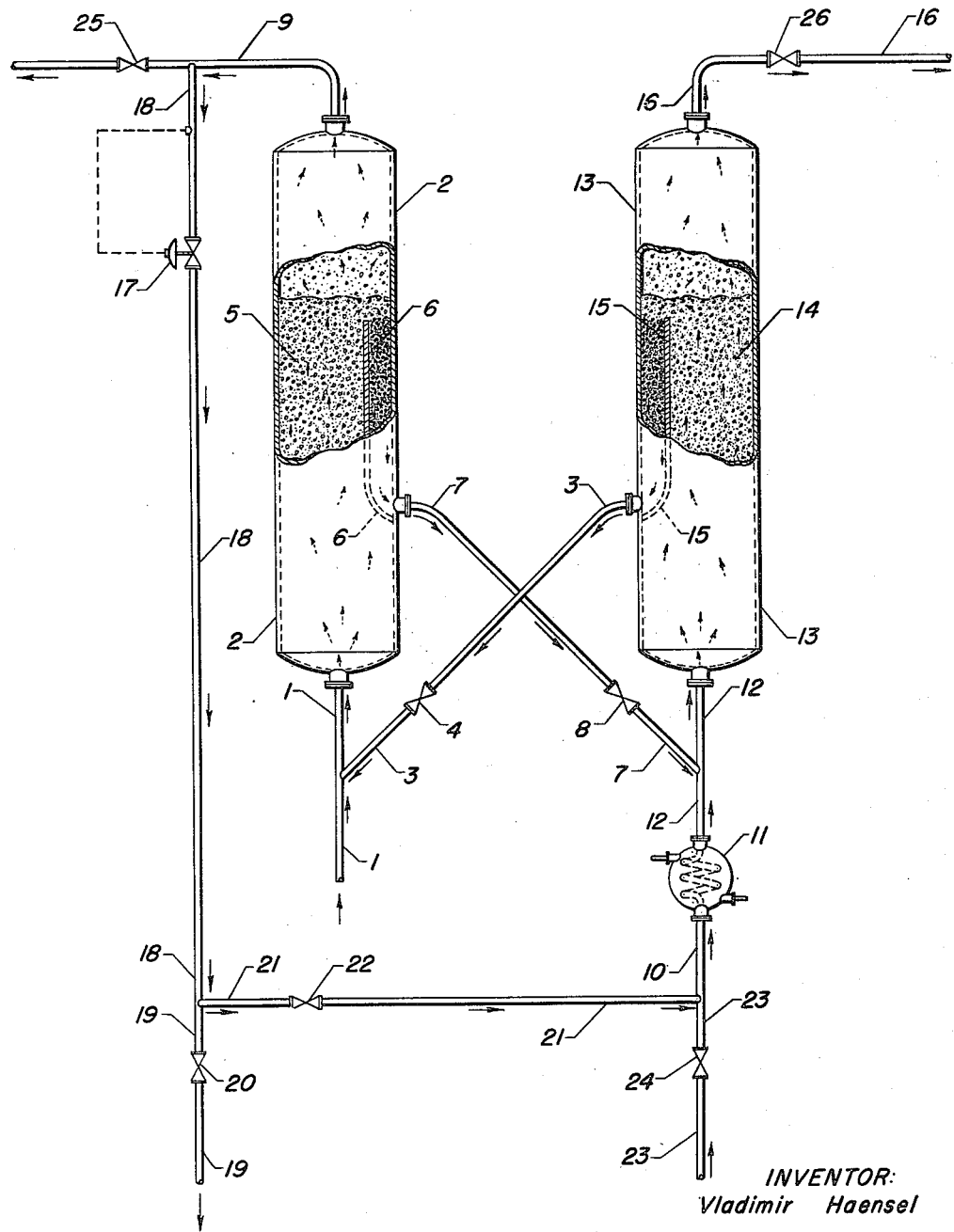
INVENTOR:
Vladimir Haensel
By: Chester J. Giuliani
    Philip T. Liggett
            ATTORNEYS:

United States Patent Office 2,818,323
Patented Dec. 31, 1957

2,818,323

PURIFICATION OF GASES WITH AN AMINE IMPREGNATED SOLID ABSORBENT

Vladimir Haensel, Hinsdale, Ill., assignor to Universal Oil Products Company, Des Plaines, Ill., a corporation of Illinois Application October 7, 1953, Serial No. 384,575

9 Claims. (Cl. 23—2)

This invention relates to a novel composition for the purification of gases and to the process for the removal of acidic gases from a gas stream employing this composition.

It is frequently desirable to remove acidic gases such as hydrogen sulfide, carbon dioxide, sulfur trioxide, etc. from a stream containing them. This removal is frequently accomplished by contacting the total gas stream with a basic or alkaline substance such as solutions of caustic, sodium carbonate and other basic salts. It is difficult to regenerate these solutions after they are spent because stable sulfides are formed and they are generally discarded after a short period of use.

A more successful method of removing acidic gases is to contact the gas stream with an amine solution. The amine solution may be regenerated and reused indefinitely since the compound resulting from the reaction of the mildly basic amine and the acid gas is unstable and readily decomposible. A typical application of the use of an amine solution is in the removal of hydrogen sulfide from a gas stream such as a hydrogen gas stream containing hydrogen sulfide as an impurity. In such an application the gas stream may be countercurrently contacted with the amine solution to effect the removal of hydrogen sulfide by forming a loosely bound compound of the amine and the hydrogen sulfide. The sulfur-containing amine solution is then removed from the contacting zone and heated or otherwise treated to decompose the sulfur compound and to restore the amine solution. The restored amine solution may be reused and the hydrogen sulfide resulting from the regeneration of the solution may be discarded.

Although the use of an amine solution is a successful method of removing hydrogen sulfide or other acid gases from a gas stream, there are many applications wherein the amine solutions cause a great deal of difficulty in a process. For example, in a process for reforming gasoline wherein a gasoline fraction is contacted with a reforming catalyst to effect hydrogenation of naphthenic compounds to form aromatic compounds, isomerization of straight chain compounds to form more highly branched chain compounds, dehydrocyclization of paraffinic compounds to form aromatic compounds, selective cracking of heavier compounds to form lighter compounds, etc., there is realized a net production of hydrogen. The presence of hydrogen is necessary to minimize carbon formation and it is, therefore, desirable to recirculate at least a portion of this hydrogen produced. Any sulfur-containing compounds in the charge stock to the process will be hydrogenated to form a hydrocarbon and hydrogen sulfide and the resulting hydrogen sulfide will appear in the recycle gas stream. Since reforming catalysts are frequently sensitive to sulfur poisoning it is desirable to remove the hydrogen sulfide from the recycle gas stream. Countercurrent scrubbing with an amine solution successfully removes the hydrogen sulfide.

It has been found, however, that many reforming catalysts are sensitive to amine poisoning so it is necessary to scrub the recycle gas with water subsequent to the amine treatment to remove volatilized amines from the gas stream thereby preventing their contact with the catalyst and also to prevent the loss of amines and the need for replacing them. When the catalyst is also water sensitive it is necessary to have a third step wherein the gas is dried either by contact with a solid desiccant such as silica gel, alumina, or Drierite, or with a liquid desiccant such as glycol, etc. It is, of course, necessary to have a step in the process for replacing or regenerating the drying material also.

It is an object of this invention to produce a dry particulate basic medium.

It is another object of this invention to provide a process for the dry removal of acid gases from a gas stream. In accomplishing these objects and others which will become apparent from the subsequent specification and claims, most of the above enumerated difficulties are overcome.

It is an embodiment of the present invention to produce a dry, solid composition comprising an adsorptive solid and an amine by impregnating said adsorptive solid with an amine.

It is another embodiment of this invention to provide a method of purifying an acidic gas-containing stream by contacting said stream with a dry, solid composition comprising an adsorptive solid and an amine.

It is a specific embodiment of this invention to provide a method of purifying an acidic gas-containing stream by contacting said acidic gas-containing stream with a dense fluidized bed of a dry, solid composite comprising an adsorptive solid and an amine, separating a resultant purified gas stream from said dense fluidized bed and passing the purified stream from the contacting zone, passing a stream of contaminated solid particles from the contacting zone into a regeneration zone wherein the contaminants are removed from the solid particles and returning said solid particles to said contacting zone.

I have found that a suitable adsorptive solid material may be impregnated with a large quantity of high boiling amine and still retain the characteristics of a dry solid. The highly adsorptive base material may include, silica gel, alumina, zirconia, magnesia, or any mixtures thereof or it may comprise naturally occurring material which may or may not be treated to improve its characteristics such as clay, kieselguhr, diatomaceous earth, activated charcoal and the like. When these adsorptive bases are treated with amines, the amines are tenaciously bound to the surface by adsorptive forces and assume the physical characteristics of the base upon which they are adsorbed. Particularly when a high boiling amine is used, it is extremely difficult to remove amines from the base even at temperatures and pressures that would ordinarily volatilize the amine. The base may therefore be subjected to varying processing conditions without losing its concentration of amine. It is also found that the amines so adsorbed on a base retain their chemical characteristics and react as mildly basic compounds when subjected to various reagents.

The amine may be impregnated on the base in any suitable manner such as by soaking the base in the amine or in a solution of the amine and subsequently draining and drying the treated base, by spraying liquid amine onto the base, by treating the base with amine in the gaseous state, by reacting various substances to form the amine directly on the surface of the base or by any combinations of these or equivalent methods.

The solid material may be in the form of a powder or in the form of particles of any size ranging up to ½ inch in diameter or greater. They may be ground, crushed, shaped pellets or, in a preferred embodiment, in the form of spheres which are prepared by dropping a gellable hydrous inorganic oxide sol into a gelling fluid.

It is particularly preferred that the amine used is a high boiling amine, however, others may be used for special situations. The preferred amines are diethanolamine, dipropylamine, dipropanolamine, butylamine, dibutylamine, etc.

The process may be effected in any manner commonly used for effecting processes with solid particulate material such as those used in the catalytic contacting art. The solid amine-impregnated material may be disposed in a fixed bed with the gas to be treated passed therethrough or it may be disposed in a moving bed so that the gas to be treated passes downwardly through the bed while the bed descends as a dense, moving column of particles concurrently with the gas stream. In a preferred embodiment the contact may be effected in what is known as a dense phase fluidized bed wherein the gas passes upwardly through a bed of particles maintaining them in a pseudo liquid state of hindered settling so that the bed has the appearance of a boiling liquid. This manner of contacting is preferred in that the temperature of the bed is maintained uniform, the particles are in motion so that there is no channeling of the fluid and all of the particles are utilized equally.

In another embodiment, particularly when the amount of acid gas to be removed is small, the contact may be effected in a suspensoid manner wherein low concentrations of solid particles are entrained in the stream of gas to be treated and pass concurrently through the treating zone after which the particles are separated from the gas stream by such means as centrifugal separators, regenerated and returned into contact with the stream. The process may also be effected by countercurrently contacting the gas with a descending rain-like dispersion of particles. When a regenerative process is to be employed it will be necessary, if a fixed bed process is used, to maintain two beds of contact material so that one might be functioning while the other is being regenerated. It is particularly preferred in a regenerative process to effect the purification in a bed of catalyst that is in motion so that transportation of the catalyst from the treating zone to a regeneration zone may be readily accomplished. In a moving bed operation the catalyst may pass from the reaction zone to the regeneration zone as a descending dense column while in the fluidized bed an internal well within the reaction zone may collect solid particles in a dense bed or a column which may then be passed to the regeneration zone by gravity. It is of course, obvious that numerous modifications and combinations of these contacting metohds may be employed by anyone familiar with the art and the modified process will still be within the broad scope of this invention.

In the regeneration zone the contaminated solid contact material will be restored to activity so that it may be returned to the contacting zone for further use therein. Since the weakly basic amines form unstable compounds with the acid component of the gas it is usually sufficient to merely heat the particles in the regeneration zone in order to restore at least a portion of their ability to remove acidic components. This method of regeneration is particularly desirable when it is desired to obtain relatively pure hydrogen sulfide or other acidic gas as a product of the process.

It is generally more satisfactory to regenerate the solid contact material by heating and simultaneously stripping with a gas stream. The stripping gas stream may contact the particles in the regeneration zone in any of the manners hereinabove enumerated for contacting particles in the reaction zone. The stripping gas will of course be a gas that is substantially non-reactive with the amine or one which reacts with the amine in such a way as to not impair its ability to remove acidic components from the stream to be treated. Suitable regeneration gases may include hydrogen, steam, nitrogen, flue gas, etc. When the hydrogen sulfide recovered is to be used in the production of sulfur compounds such as sulfuric acid it may be desirable to use air as the regeneration gas so that a combustible mixture of hydrogen sulfide and air discharges from the regeneration zone. The mixture may then be burned to form sulfur dioxide which is the starting material for many processes. When large quantities of flue gas are available it may be desirable to use flue gas as the regeneration gas and this embodiment is particularly desirable when the flue gas is already at a high temperature and therefore in the proper condition for regeneration.

One especially desirable method of regenerating the contact material is to pass the net gas make from a reforming process through the regeneration vessel thereby stripping the solid particles with the waste gas from the process. Since regeneration is effected more successfuly at higher temperatures it may be necessary to preheat the regeneration gas if it is not already available at a sufficiently high temperature level. It is, of course, obvious that the preheating may be accomplished with a conventional heater or by some heat exchange relationship with other streams in the process.

The process of the present invention may be effected at any suitable temperature and pressure. Generally the temperature will be relatively low, for example, in the range of from room temperature to about 200° F. or 300° F. since recycle gas streams from hydrocarbon conversion processes are generally at such conditions that heavier components are not in the vapor phase. For example, the recycle gas stream of a reforming unit will be cooled to temperatures of about 100° F. prior to recirculation so that normally liquid hydrocarbons will not be circulated in the gas stream but will appear in the liquid product. The pressure maintained in the contacting zone will have little effect on the process. Generally pressures of from about 100 p. s. i. to about 1000 p. s. i. or more will be used, however, higher or lower pressures are satisfactory. The temperature and pressure must be such that the amine will not volatilize and be removed from the solid. Temperatures higher than the boiling point of the amine at the existing pressure may be used since the adsorptive power of the solid material is such as to retain the amine on its surface even at elevated temperatures. Higher pressures of course, will prevent volatilization of the amine and will usually improve its ability to chemically bind hydrogen sulfide. For any given process a particularly adaptable amine may be selected, that is, when a high temperature purification is to be effected a higher boiling amine may be adsorbed on the base material. Another consideration is the decomposition temperature of the amine. At high temperatures it will be necessary to choose more stable amines than when the purification is effected at low temperatures.

The accompanying drawing is for the purpose of further clarifying the process of the present invention but is not intended to limit unduly the invention to the particular process or material described. The drawing is described in relation to a purification of a recycle hydrogen stream in a reforming process for the sake of simplicity. The description of this particular process is for the purpose of illustration and is not intended as a limitation.

Line 1 carrying hydrogen and hydrogen sulfide containing gas from the separator of a reforming process passes into the lower portion of contacting zone 2. Solid, dry amine-containing material in particle form passes into line 1 through line 3 and valve 4 and is concurrently carried into contacting zone 2 with the gas stream passing through line 1. In contacting zone 2 a dense phase fluidized pseudo liquid bed of solid material is maintained at a level 5 and the resultant contact of the solid material with the hydrogen sulfide-containing gas results in the production of a substantially hydrogen sulfide-free gas and a contaminated solid-containing chemically bound hydrogen sulfide. The purified gas stream passes through suitable separation devices, to remove solid particles from the gas, which are not shown, discharges from the top of contacting zone 2 through line 9 and valve 25 and is at least in part returned to the reforming operation.

Contaminated catalyst settles as a dense phase descending column in withdrawal well 6 in the interior of contacting zone 2 and in the lower portion of withdrawal well 6 the contaminated contact material is withdrawn through line 7 and valve 8 and passes into line 12. Regeneration gas entering line 12 through line 10 and heater 11 carries the mixed stream of regeneration gas and contaminated contact material to regeneration zone 13 wherein a second dense fluidized pseudo liquid bed of contact material is maintained. As a result of the contact with hot regeneration gas the contaminated contact material decomposes to form hydrogen sulfide and the original amines are restored. The stream of regenerating gas and hydrogen sulfide passes through suitable separation devices to remove solid particles from the gas stream which are not shown, and is withdrawn from the upper portion of regeneration zone 13 through line 16 and valve 26 to be vented or otherwise used. The regenerated contact material is accumulated in withdrawal well 15 disposed in regeneration zone 13, passed from the lower portion of withdrawal well 15 as a dense phase descending column into the before mentioned line 3, through valve 4 and commingled with hydrogen sulfide-containing gas in the beforementioned line 1.

In the particular embodiment shown the contacting and regeneration zones are maintained at the same pressure as the reforming zone. In this particular embodiment the regeneration gas may comprise excess hydrogen from the reforming process which is vented through pressure control valve 17 and line 18 and either discharged to the atmosphere through line 19 and valve 20 or passed to the before mentioned line 10 through line 21 and valve 22. Another embodiment which may be used is to pass a regeneration gas foreign to the process, such as air or nitrogen, through regeneration zone 13 by way of line 23 and valve 24.

Heater 11 may be any suitable conventional heater such as a direct fired heater or an electrical heater, but is preferably a heat exchanger which uses heat from some other process stream in the plant. One suitable arrangement for this heat exchange may be a heat exchange relationship between the incoming gas stream and the effluent from the reforming process, which requires cooling. There are of course many other heat exchange relationships which may be adapted for use in this position.

Although the process illustrates a cross-flow type of vessel arrangement many other arrangements may be used as for example, an arrangement in which the contacting vessel is at a higher elevation than the regeneration vessel and vice versa so that the flow of solid particles from one zone to another may be through the medium of a lifting gas stream while the return flow of solid particles may be by gravity. Other arrangements are to have the two zones contained in a unitary vessel with suitable baffling and purging zones therebetween to prevent the transfer of regeneration gas to the contacting zone. Many other modifications may be used by those skilled in the art, however, all of these are in the broad scope of this invention.

I claim as my invention:

1. A continuous method for purifying an acidic gas-containing stream which comprises passing said acidic gas-containing stream into the lower portion of a contacting zone containing dry, subdivided solid particles comprising an adsorptive solid and an aliphatic amine at a velocity sufficient to maintain said solid in a fluidized bed, contacting said stream with said particles at an acidic gas absorbing temperature not in excess to 300° F., separating a resultant purified gas stream from said fluidized bed, passing said purified stream from said contacting zone, passing at least a portion of the solid particles from said contacting zone into a regeneration zone and therein regenerating the same by contact with a reducing gas at a regenerating temperature not in excess of 300° F. and returning regenerated particles to said contacting zone.

2. The method of purifying an acidic gas-containing stream which comprises passing said stream into the lower portion of a contacting zone containing dry, solid particles comprising an adsorptive solid and an aliphatic amine at a velocity sufficient to maintain said particles in a fluidized bed, contacting said stream with said particles at an acidic gas absorbing temperature not in excess of 300° F., separating a resultant purified gas stream from said fluidized bed, passing said purified gas stream from said contacting zone, passing a portion of said solid particles from said contacting zone into a regeneration zone and therein regenerating the same by contact with hot hydrogen-containing gas at a regenerating temperature not in excess of 300° F. and returning the resultant regenerated particles to said contacting zone.

3. The process of claim 2 further characterized in that said contact with regeneration gas is effected in a fluidized bed.

4. The method of claim 1 further characterized in that said amine is selected from the group consisting of diethanolamine, dipropylamine, dipropanolamine, butylamine and dibutylamine.

5. The method of claim 1 further characterized in that said amine is diethanolamine.

6. The method of claim 1 further characterized in that said amine is dipropanolamine.

7. The method of claim 1 further characterized in that said amine is dipropylamine.

8. The method of claim 1 further characterized in that said amine is butylamine.

9. The method of claim 1 further characterized in that said amine is dibutylamine.

References Cited in the file of this patent
UNITED STATES PATENTS

| Number | Name | Date |
|---|---|---|
| Re. 18,958 | Bottoms | Sept. 26, 1933 |
| 2,033,698 | Finn | Mar. 10, 1936 |
| 2,367,694 | Snuggs | Jan. 23, 1945 |
| 2,369,709 | Leffer | Mar. 19, 1946 |
| 2,400,709 | Patrick | May 21, 1946 |
| 2,523,149 | Scheeline | Sept. 19, 1950 |
| 2,603,553 | Berg | July 15, 1952 |
| 2,631,921 | Odell | Mar. 17, 1953 |
| 2,668,748 | Asbury | Feb. 9, 1954 |